July 12, 1966     W. A. BOOTHE     3,260,456
FLUID-OPERATED ERROR SENSING CIRCUIT
Filed Sept. 23, 1964     2 Sheets-Sheet 1
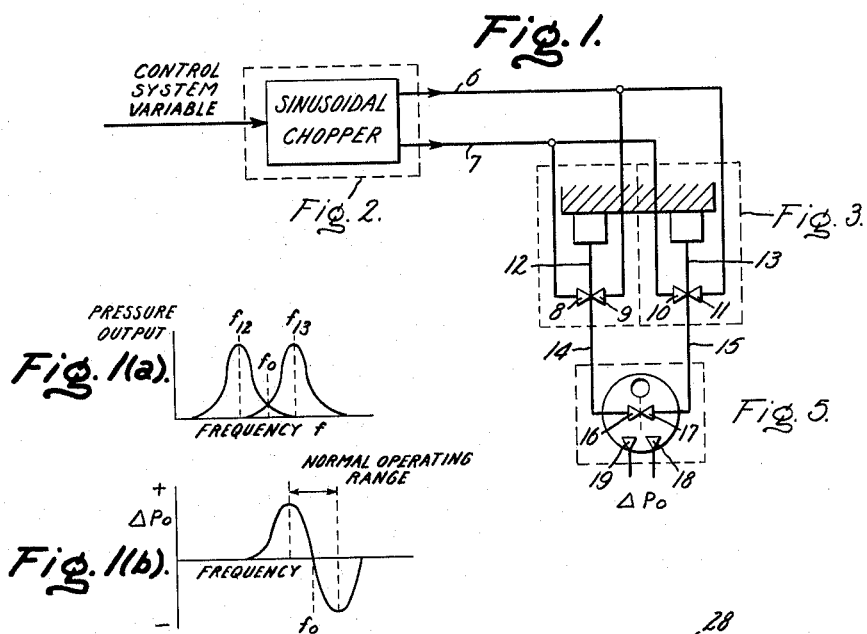
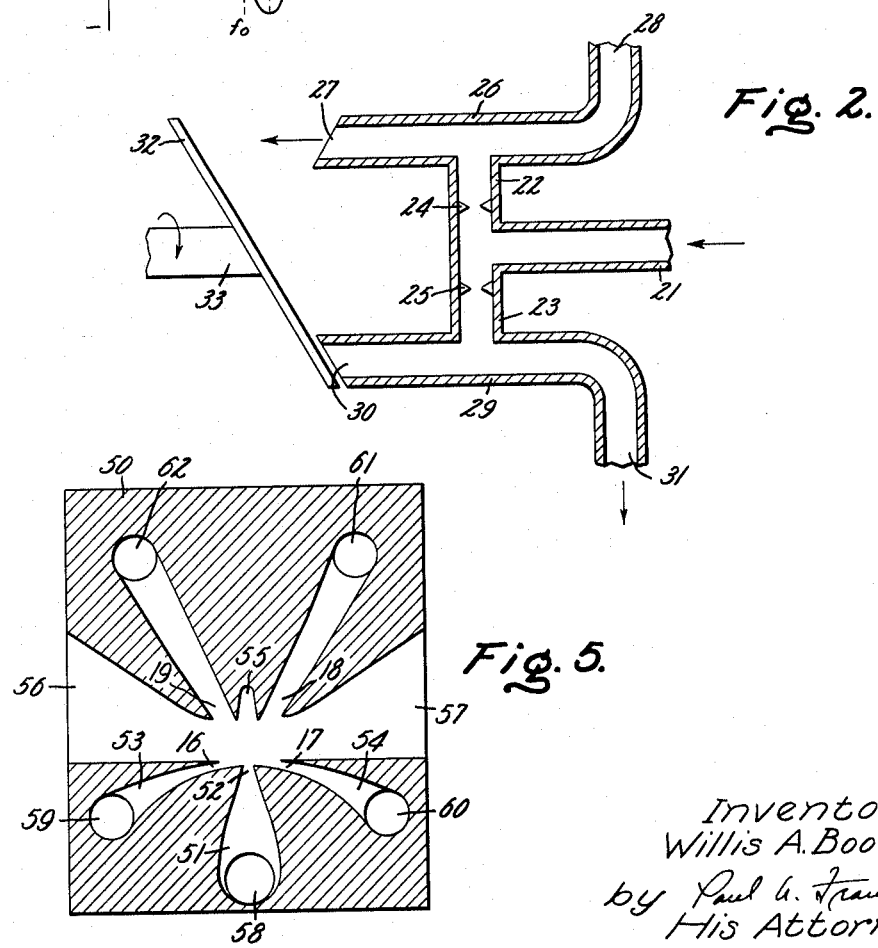
Inventor:
Willis A. Boothe,
by Paul A. Frank
His Attorney.

July 12, 1966 W. A. BOOTHE 3,260,456
FLUID-OPERATED ERROR SENSING CIRCUIT
Filed Sept. 23, 1964 2 Sheets-Sheet 2
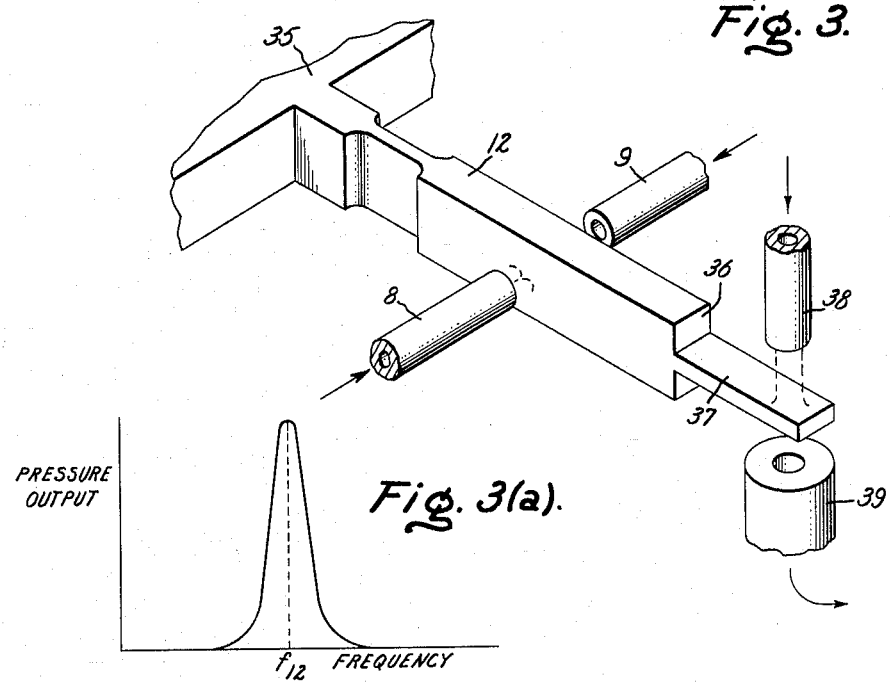
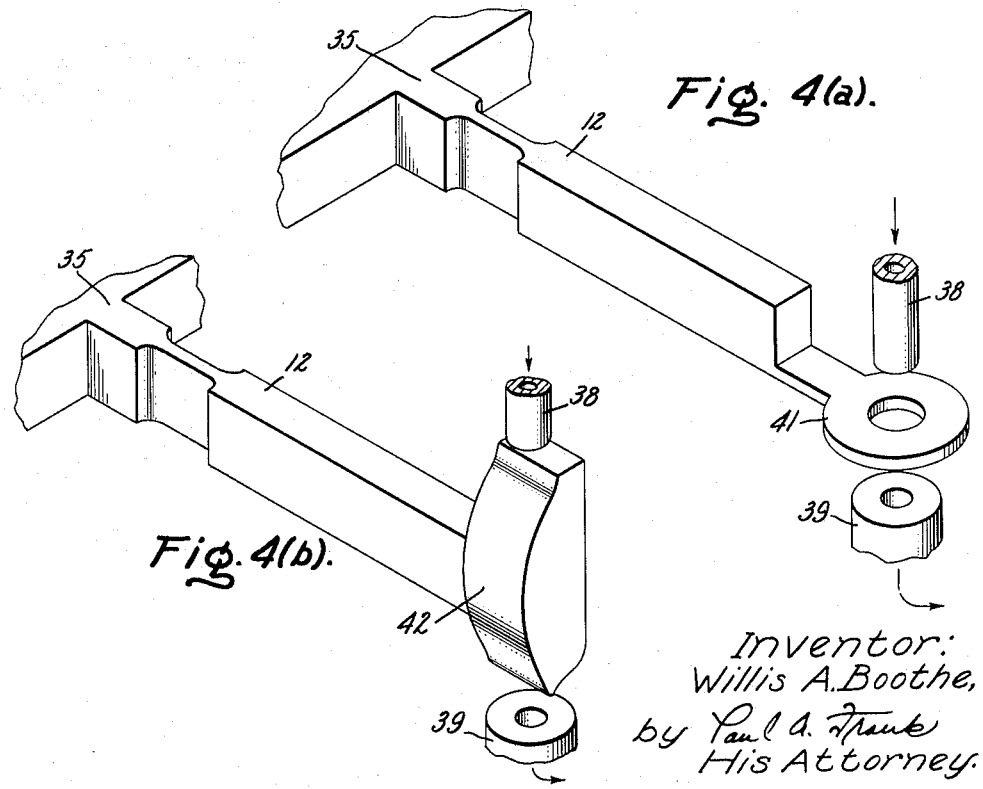
Inventor:
Willis A. Boothe,
by Paul A. Frank
His Attorney.

3,260,456
FLUID-OPERATED ERROR SENSING CIRCUIT
Willis A. Boothe, Scotia, N.Y., assignor to General Electric Company, a corporation of New York
Filed Sept. 23, 1964, Ser. No. 398,674
10 Claims. (Cl. 235—200)

My invention relates to an error sensing circuit for providing signals indicative of the deviation of a control system variable from a desired value thereof, and in particular, to such circuit employing fluid control devices for providing the signals in fluid form.

In numerable instances, in all phases of technology, control systems of the closed loop type are employed to regulate a selected condition or control system variable to a desired value thereof. In many of these control systems, it is required that the control system variable be monitored in an error sensing circuit to determine the deviation of its value from a desired value thereof, and further, to determine the status of deviation as being within or outside a predetermined or normal operating range thereof. Under conditions of system operation within the normal operating range, a basic loop of the control system is operable, in general, to regulate the selected control system variable to the desired value. Illustratively, the selected condition or control system variable may be the magnitude of a rotational velocity such as that of a steam turbine, a frequency, the liquid level within an enclosed container, or the pressure or temperature of a gas or liquid. In effect, the selected control system variable may comprise any function or condition which can be sensed and monitored to provide a signal or other indication of particular values thereof.

Frequently, the region in which the control system variable is to be monitored introduces extreme environmental problems, such as shock, vibration, nuclear radiation and high temperature. Prior art systems, particularly those comprising electronic elements and nonfluid mechanical elements, are incapable of withstanding such extreme environmental conditions and thus do not continue performing in a satisfactory manner.

In contradistinction, fluid control devices, especially of the type known as fluid amplifiers, feature reliability and an essentially unlimited life span since generally they employ neither mechanical moving parts, thereby avoiding frictional wear, nor parts undergoing self deterioration or dissipation in operation, thereby avoiding a limited life span such as that experienced in an electron tube due to cathode deterioration. Further, they can be produced at low cost due to their ease of fabrication from virtually any material that is nonporous and has structural rigidity. In addition, the devices may be connected in circuit relationship either by appropriate interconnection of individual devices or by the formation of the devices in interconnected fashion directly in a single piece of material. Fluid control devices are thus particularly ideal for applications wherein conditions of nuclear radiation, high temperature, vibration and mechanical shock may be present.

Two of the basic types of fluid control devices known as fluid amplifiers are generally referred to as the analog and the digital type. In both of these types of fluid control devices, a first fluid (often called a power fluid) is received through a first (power) fluid inlet and formed into a first (power) jet. Similarly, a second fluid (often called a control fluid) is received through second (control) fluid inlets and formed into second (control) jets directed against one or opposite sides of the first jet for deflecting such jet selectively for reception within one or the other of two fluid receivers. Each of the receivers is formed as an integral portion of a power flow passage, the latter in communication with an associated power fluid outlet on the device. The same or different types of fluid mediums may be employed as the control and power fluids, the fluids including both compressible fluids such as gas and air, and relatively incompressible fluids, such as water and oil.

Since fluid control devices, especially of the fluid amplifier type, operate satisfactorily in a variety of environmental conditions in which electronic and purely mechanical devices normally fail, there is a need for obtaining a control system, and in particular, the error sensing circuit above-mentioned comprised of fluid control devices.

Therefore, one of the principal objects of my invention is to provide an error sensing circuit employing fluid as the operating medium.

Another object of my invention is to provide an error sensing circuit employing fluid control devices connected in circuit relationship for indicating the deviation of a control system variable from a desired value thereof.

A still further object of my invention is to employ a fluid amplifier as one of the fluid control devices in the error sensing circuit.

Briefly stated, my invention is a new fluid-operated error sensing circuit for providing a pressurized fluid output signal indicative of the deviation of a control system variable from a desired value thereof, that is, a signal representing the magnitude of the error of the control system variable, and further, indicative of the status of the deviation as being within a predetermined or normal operating range of the control system variable. The error sensing circuit is comprised by a sensor means which monitors the particular control system variable being regulated. The sensor is provided with a pair of fluid outlets displaced 180° apart for generating a pair of 180° phase displaced pressurized fluid signals at a frequency which represents the monitored value of the control system variable. A pair of tuned resonant devices are also provided, each resonant device having associated therewith a pair of vibration inducing fluid inlets in communication with the sensor fluid outlets for applying a driving force to the respective resonant device. The two resonant devices have natural vibration resonant frequencies respectively above and below a desired value of frequency which represents the desired value of the control system variable. The resonant devices, upon being actuated by 180° phase displaced signals of frequency within the frequency response of the resonant device, are vibrated at an amplitude determined by the proximity of the monitored frequency to the resonant frequency of the resonant devices. The resonant devices are adapted to generate two pressurized fluid signals wherein each signal represents the monitored value of the control system variable as a function of the resonant frequency of the respective resonant device. The fluid signals generated by the two resonant devices are supplied to oppositely disposed control fluid inlets of a fluid amplifier. Fluid output differential pressure signals developed within the power fluid outlets of the fluid amplifier are indicative of the deviation of the control system variable from the desired value thereof, and further, are indicative of the status of deviation as being within a predetermined operating range of values thereof as determined by the two resonant frequencies of the resonant devices.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the figures are identified by the same reference character and wherein;

FIGURE 1 is a schematic representation of a fluid-operated error sensing circuit constructed in accordance with my invention;

FIGURE 1(a) illustrates a distribution curve of the frequency-response of the tuned resonant devices of FIGURE 1;

FIGURE 1(b) illustrates an output differential pressure-frequency curve in accordance with my invention;

FIGURE 2 is a diagrammatic view of a fluid-mechanical sensor for monitoring a control system variable in accordance with my invention;

FIGURE 3 is a first embodiment of a tuned resonant device employed in my error sensing circuit;

FIGURE 3(a) illustrates the pressure-frequency relationship within the sensing receiver as shown in FIGURE 3;

FIGURES 4(a) and 4(b) illustrate two additional embodiments of a tuned resonant device; and FIGURE 5 is a diagrammatic view in top plan of an analog-type fluid control device.

Referring now to the drawings, in FIGURE 1 there is shown a schematic representation of a fluid-operated error sensing circuit constructed in accordance with my invention. The error sensing circuit illustrated in FIGURE 1 is adapted to provide pressurized fluid signals indicative of the magnitude of deviation of a control system variable from a desired value thereof. Such error sensing circuit finds application in many control systems which are designed to regulate a selected condition or control system variable to a desired value thereof, and will be described with specific reference to a speed control system for a steam turbine. Thus, the error sensing circuit herein disclosed comprises a portion of a basic control system loop (not shown) which controls the operation of a turbine steam valve cylinder while the turbine speed is within a normal operating range thereof. In the event that the turbine speed falls outside the normal operating range, a second control system loop having a wider range than the basic loop may be employed. The error sensing circuit, as illustrated schematically in FIGURE 1, will now be described in terms of its operation. The particular components which comprise the various elements of the schematic circuit will thence be described with relation to FIGURES 2 through 5.

In closed loop control systems, a control system variable being regulated must be monitored by a sensor means, indicated in FIGURE 1 as a block designated "sinusoidal chopper" and illustrated in detail in FIGURE 2. The particular sensor illustrated in FIGURE 2 is a fluid-mechanical device for generating a pair of 180° phase displaced sinusoidal pressurized fluid signals having a frequency directly proportional to the magnitude of the monitored control system variable, in this particular case the rotational shaft speed of the steam turbine. The sinusoidal chopper is provided with two fluid outlets which provide the pair of 180° phase displaced fluid signals.

The 180° phase displaced fluid signals are supplied from the outlets of the sinusoidal chopper to a pair of tuned resonant devices by means of lines 6 and 7 which comprise conduits for the fluid signals. The resonant devices are indicated in greater detail in FIGURE 3 and comprise two spring mass devices 13 and 12 having natural vibration (resonant) frequencies, respectively, above and below a desired value of a frequency which is proportional to the desired value of the control system variable. The resonant frequencies define a predetermined or normal operating range of the control system variable. Conduits 6 and 7 are in communication with two pairs of oppositely disposed vibration inducing inlets, that is, driving nozzles 8, 9 and 10, 11 respectively, each pair of nozzles being associated with a respective spring mass device, directed thereagainst, and positioned intermediate the ends thereof. The two 180° phase displaced sinusoidal pressurized fluid signals from the sinusoidal chopper thus provide a sinusoidal driving force to the tuned resonant devices 12, 13 at a frequency determined by the monitored value of the control system variable. Attached to the free end of each resonant device, or forming a part thereof, is a fluid intercepting (or fluid passing) member, illustrated in detail in FIGURES 3, 4a, and 4b. A sensing nozzle supplied from a source of substantially constant pressurized fluid and a sensing fluid receiver are disposed on opposite sides of each intercepting (or fluid passing) member and substantially in alignment. Thus, upon resonant devices 12, 13 not being supplied with pressurized fluid signals from the sinusoidal chopper, or, alternatively, being supplied with such signals, but of frequency beyond the frequency response of each resonant device, such devices remain stationary and the fluid intercepting (or fluid passing) members intercepts (or passes) all of the fluid supplied by the sensing nozzles such that no (or all of the) fluid impinges on the sensing receivers.

Resonant devices 12, 13 have frequency response or resonance characteristics as illustrated by the frequency-pressure distribution curves illustrated in FIGURE 1(a) wherein the pressure is the fluid pressure of the output signal within the sensing receivers. The tuned resonant frequency of resonant device 12 is indicated as $f_{12}$ and is selected to be a particular value below a desired value of frequency, $f_0$, to be maintained by the control system, $f_0$ representing the desired value of the control system variable being controlled. Resonant device 13 is selected to have a natural vibration frequency $f_{13}$ which is a predetermined value above the desired value of frequency $f_0$. The control system is operable with extreme accuracy of control by designing the resonant devices with natural frequencies of vibration $f_{12}$, $f_{13}$ which are within approximately 10% of the desired frequency $f_0$. It is to be noted that the predetermined or normal operating range of my fluid-operated error sensing circuit is defined as being in the frequency range $f_{12}$–$f_{13}$ although the circuit is also operable slightly outside the normal operating range but within the frequency response of the particular resonant device. In general, however, the wider range loop of the control system hereinabove mentioned is adapted to be actuated and operable when the value of the control system variable falls outside the normal operating range.

The vibration responsive fluid outlets (the sensing receivers) associated with resonant devices 12, 13 are in communication with control fluid inlets of a fluid amplifier device shown in greater detail in FIGURE 5. It may be noted in FIGURE 1 that the conduits 14 and 15, which are connected to the sensing receivers of resonant devices 12 and 13, respectively, supply control fluid to oppositely disposed control fluid jet forming nozzles 16 and 17 of the fluid amplifier. As a result, the fluid amplifier produces a subtracting function of the two pressurized fluid signals provided by the sensing receivers, and a characteristic output differential pressure $\Delta P_0$ is generated as a function of the fluid signal frequency as shown in FIGURE 1(b). The frequency $f_0$ which represents the desired value of the control system variable to be regulated is thus seen to be the point of intersection of the frequency response curves $f_{12}$ and $f_{13}$ in FIGURE 1(a), and is represented as the zero cross over point in FIGURE 1(b). The desired frequency $f_0$ may be midway between resonant frequencies $f_{12}$ and $f_{13}$, or merely at a point intermediate such two frequencies, depending upon the resonant characteristics of each individual resonant device.

The fluid amplifier device is provided with two fluid receivers 18, 19 and the fluid output differential pressure signal $\Delta P_0$ developed across the outlets thereof provides the error signal employed in the remaining portion of the control system loop (not shown) for regulating the control system variable to the desired value thereof. The operation of my fluid-operated error sensing circuit may thus be summarized as follows: Assume the condition wherein the control system variable (or frequency associated therewith) is considerably outside the normal operating range thereof. Under such condition, the 180° phase displaced fluid signals generated by the sinusoidal chopper have a frequency outside the frequency response of either resonance device 12, 13 and hence, no vibration of such devices is effected. The fluid output differential pressure signal $\Delta P_0$ generated at the output of the fluid amplifier device thus has a value of zero which commands the control system to maintain a constant steady state condition. Now, assume that the control system variable (monitored frequency) is slightly below the desired value $f_0$ but within the frequency response of resonance device 12, and possibly also within the frequency response of device 13, but to a much smaller degree. Under this latter condition, the 180° phase displaced signals generated by the sinusoidal chopper cause resonance device 12 (and possibly also device 13) to vibrate at a magnitude determined by the FIGURE 1(a) relationship of the monitored frequency generated by the sinusoidal chopper to the resonant frequency of resonance device 12 and 13. The vibration of resonance device 12 (and 13) results in intermittent opening (or closing, depending upon whether the member of FIGURE 3 or 4 used) of a fluid path from the sensing nozzle to the sensing receiver associated with resonance device 12 (and 13) thereby introducing a control fluid flow into conduit 14 (and 15). The control fluid flow in conduit 14 is substantially greater than any possible flow in conduit 15 and hence causes deflection of a power jet of fluid within the fluid amplifier device such that a greater fluid pressure is obtained at receiver 18 as opposed to receiver 19, thereby producing an output fluid signal $\Delta P_0$ having a positive differential pressure as indicated in FIGURE 1(b). Such error signal commands the control system to increase the magnitude of the control system variable, and, in the case of the steam turbine, to increase the opening of a steam valve associated with a steam cylinder thereof. In like manner, operation of the system wherein the control system variable is slightly above the desired value $f_0$ but within the frequency response of resonance device 13 (and possibly also device 12) produces a substantially greater control fluid flow in conduit 15 than in 14 thus deflecting the power jet within the fluid amplifier in a direction toward receiver 19 to produce an output differential pressure signal $\Delta P_0$ which is negative. This negative differential pressure error signal commands the control system to cause a partial closure of the steam valve to produce a sufficient deceleration of the steam turbine to attain its desired speed represented by frequency $f_0$.

The various components shown schematically in FIGURE 1 will now be described in detail. The sensor means designated sinusoidal chopper is illustrated in FIGURE 2 as a fluid-mechanical device for generating a pair of 180° phase displaced pressurized fluid signals having a frequency directly proportional to the monitored value of a control system variable. A continuous sources of pressurized fluid is supplied to an inlet pipe 21 and divided to pass as first and second flows of pressurized fluid through pipes 22 and 23, the latter being provided with fluid flow restrictors 24 and 25, respectively. Pipe 22 communicates with a delivery pipe 26, the latter having a first open end comprising a control port 27 and a second, or delivery end 28 provided for communication with conduit 6 and thereby transmitting one of the pair of 180° phase displaced fluid signals to the driving nozzles 9 and 11 of spring mass devices 12 and 13, respectively, as shown in FIGURE 1. Pipe 23 similarly communicates with delivery pipe 29, the latter being provided with a first open end comprising a control port 30 spaced 180° from control port 27 and a second, or delivery end 31 provided for communication with conduit 7 thus transmitting the second of the pair of 180° phase displaced fluid signals to driving nozzles 8 and 10.

In operation, a wobble plate 32 is mounted in an angularly displaced manner on shaft 33 which is rotated at the turbine speed or a speed proportional thereto. For the position of the wobble plate 32 shown in FIGURE 2, control port 30 is closed off, thereby causing a flow of pressurized fluid at the delivery end 31 of the delivery pipe 29. Since the control port 27 is open at this time, the flow of pressurized fluid in pipe 26 freely passes thereto. Due to back-pressures developed at delivery end 28 from the spring mass devices in communication therewith, little or no pressurized fluid will pass therethrough. As wobble plate 32 is rotated, control port 27 is closed off and control port 30 is opened, thereby effecting a flow of pressurized fluid at delivery end 28 of the pipe 26. As hereinbefore explained, back pressure from the spring mass devices will substantially terminate the flow of pressurized fluid at the delivery end 31 of delivery pipe 29. As a result of the 180° spacing of the control ports, the fluid signals derived from delivery ends 28 and 31 are 180° phase displaced pressurized fluid signals. The complementary or 180° phase displaced fluid signals are generated at the frequency of rotation of shaft 33 and may be of any desired waveform, depending on the orientation of wobble plate 32. In the preferred embodiment herein described, the angularly oriented plate provides a sinusoidal variation in the restriction of the outlet of the two control ports 27 and 30 thereby generating sinusoidal fluid signals. Another embodiment of the sensor means comprises a suitable cam with radially or axially positioned nozzles.

A first embodiment of a spring mass device of the type identified by numerals 12 and 13 in FIGURE 1 is illustrated in detail in FIGURE 3 and comprises a tuned resonant vibrating reed of conventional design. Any of a number of other known frequency sensitive vibrating devices such as a tuning fork or other elongated spring mass device may also be employed in place of the tuned reed. Tuned resonant reed 12 is fixed at a first end 35 thereof and is provided with a spatula-like intercepting member 37 at the free end 36 thereof. A sensing nozzle 38 and sensing receiver 39 are disposed on opposite sides of intercepting member 37 and are in substantial alignment. A continuous source of pressurized fluid (not shown) is supplied to sensing nozzle 38, and, under the condition wherein reed 12 is at rest, member 37 intercepts substantially all of the fluid issuing in jet form from the sensing nozzle 38 (as shown by dashed outline). Under such condition, sensing receiver 39 does not receive any of the fluid from the jet. Tuned reed 12 is at rest (in a nonvibratory mode) when the frequency of the 180° phase displaced pressurized fluid signals generated by the sinusoidal chopper are sufficiently removed from the natural vibration frequency $f_{12}$ of tuned resonant reed 12 so as to be outside of the frequency response thereof. A pair of driving nozzles 8, 9 are disposed on opposite sides of tuned resonant reed 12 and positioned approximately midway between the ends thereof. Conduits 6 and 7 are in communication with the inlets to driving nozzles 9 and 8, respectively, thereby providing the 180° phase displaced fluid signals generated by the sinusoidal chopper as a sinusoidal driving force to the tuned resonant reed 12. Upon the fluid signals from the sinusoidal chopper attaining a frequency approaching the resonant frequency of tuned reed 12, the reed and member 37 will begin to vibrate, resulting in intermittent opening of a fluid path between sensing nozzle 38 and sensing receiver 39. The pressure of the fluid signal obtained within the sensing receiver 39 varies with frequency as illustrated in FIGURE 3(a), passing through a maximum pressure point at the resonant or natural vibration frequency $f_{12}$ of tuned resonant reed 12. At fluid signal frequency $f_{12}$, reed 12 undergoes maximum amplitude of vibration. Beyond resonance, the pressure of the fluid signal obtained in sensor receiver 39 decreases as the amplitude of vibration of the reed decreases. The resonant means comprised by the spring mass device 12, driving nozzles 8, 9, sensing nozzle 38, sensing nozzle 39 and intercepting member 37 is thus adapted to generate a pressurized fluid signal representing the monitored value of the control system variable as a function of the resonant frequency of spring mass device 12. It can be appreciated that the use of two such resonant means, wherein the resonant frequency of the first and second of such means is respectively above and below a desired value of frequency $f_0$ to be maintained, can be employed to define a predetermined range of values of the control system variable.

A second embodiment of a spatula-like member which forms the free end of tuned resonant reed 12 is illustrated in FIGURE 4(a). Member 41 is disc-shaped and has a hole through the center thereof in alignment with sensing nozzle 38 and sensing receiver 39. A third embodiment of a means for sensing the amplitude of vibration of the spring mass device 12 is illustrated in FIGURE 4(b) and comprises a paddle-shaped member 42 connected to the free end of spring mass device 12. Member 42 has a curved surface adapted to be in the path of the fluid jet generated by sensing nozzle 38 when spring mass device 12 is at rest. The curved surface of member 42 directs the jet issuing from nozzle 38 into sensing nozzle 39 during the nonvibratory mode of operation of reed 12 by a jet attachment phenomenon known as the Coanda effect. It should be obvious that members 41 and 42 of FIGURES 4(a) and 4(b), respectively, are operable in a manner opposite to the operation of intercepting member 37 in FIGURE 3. In the FIGURE 3 embodiment, member 37 intercepts substantially all of the fluid flow from the jet generated by sensing nozzle 38 during the interval of nonvibration of device 12. In contradistinction, members 41 and 42 intercept none of the fluid during the non-vibratory mode of operation of device 12, whereas vibration of device 12 is sensed by the interception of a substantial, though not total, amount of fluid flow issuing from nozzle 38. Since the manner of sensing the amplitude of vibration of device 12 generates fluid signals within sensor receivers 39 which are of opposite sense in FIGURES 4(a) and 4(b) as compared to FIGURE 3, the conduit connection between the sensor receivers and the control fluid inlets to the fluid amplifier must be interchanged, or, alternatively, the fluid differential pressure signal $\Delta P_0$ at the output of the fluid amplifier must be recognized to be of opposite polarity from such signal generated by the circuit illustrated in FIGURES 1 and 3. Driving nozzles 8 and 9 have been omitted from FIGURES 4(a) and 4(b) merely for purposes of drawing simplification and are understood to be employed in the same orientation as illustrated in FIGURE 3. It should be appreciated that the primary design criterion for the vibration sensing elements 37, 41, 42 is that they be sensitive to small changes of amplitude of vibration of the reed.

Referring now to FIGURE 5, there is shown a diagrammatic representation in top plan of a momentum-exchange type of fluid control device commonly referred to as an analog-type fluid amplifier. A base member 50 in which the device is formed may be selected from virtually any material that is nonporous, has structural rigidity, and is nonreactive with the fluid medium employed. Illustratively, various plastics may be employed quite advantageously for this purpose, such materials permitting low temperature molding to form the interior channels and passages for the fluid medium. Alternatively, materials adaptable to photoetching processes may be employed, facilitating mass production of the fluid control devices. In addition, metal and other material of a more durable nature may be employed and may be slotted or molded to the desired configuration. A face plate (not shown) is positioned over the base member 50, enclosing various channels and passages to confine the fluid therein; if desired, the face plate may be a transparent material to permit interior inspection of the device.

Alternatively, the channels and passageways may pass completely through the base member 50 and a face plate provided on both sides thereof. The fluid medium employed may be a compressible fluid such as gases, including air or steam, and relatively incompressible fluids such as water or oil.

The analog amplifier shown in FIGURE 5 includes a power fluid inlet 51 terminating in a fluid flow restrictor or nozzle 52 for forming power fluid received therein into a power jet. Control fluid inlets 53 and 54 are provided, terminating in nozzles 16 and 17, respectively, for forming control fluid received therein into control jets directed against the opposite sides of the power jet. Power fluid passage 18 operates as a receiver for receiving a greater amount of the flow of power fluid from the power jet when the latter is deflected by a control jet issuing from nozzle 16. Power flow passage 19 likewise acts as a receiver for receiving a greater amount of the flow of power fluid from the power jet following deflection thereof by a control jet issuing from nozzle 17. The power flow passages 18 and 19 thus comprise the power fluid outlets of the analog fluid amplifier and provide the fluid output differential pressure signal $\Delta P_0$.

The analog fluid amplifier of FIGURE 5 derives its nomenclature from the proportional increases and decreases effected in the flows of power fluid in power flow passages 18 and 19, one relative to the other, in response to increases and decreases in the relative magnitudes of the control jets issuing from nozzles 16 and 17, respectively. The magnitude of the pressurized fluid flow in the control jets is small relative to the pressurized flow in the power jet, however, the transverse direction of impingement of the control jets on the power jet effects the deflection thereof. Thus, the analog-type fluid amplifier provides gain, the change in pressurized flow of the output power fluid being greater than the concurrent change in pressurized flows of the control fluid. Indentation 55 provided intermediate the power flow passages 18 and 19 may be used for venting. Vents 56 and 57 are also provided to equalize ambient pressures on the opposite sides of the jet and to remove excess fluid from the deflection region.

The power fluid inlet 51, control fluid inlets 53 and 54, and power fluid outlets 18 and 19 may be provided, respectively, with conduits 58–62 for interconnection of the respectively associated fluid flow passages with other portions of the fluid control system. Thus, conduit 58 is connected to a source of relatively constant pressurized fluid, conduits 59, 60 are connected to the fluid outlets of the two sensing nozzles associated with the spring mass devices 12, 13, and conduits 61, 62 are connected, in general, to one or more stages of analog amplification which form part of the control system that regulates the actuation of the steam valve in the particular application wherein the control system variable is steam turbine speed. The conduits 58–62 are represented by circular elements in FIGURE 5 and, illustratively, they comprise cylindrical conduits vertically positioned relative to the plane of the base member 50. Alternatively, slots or channels may be provided in the base member 50 extending to the periphery thereof whereby communication with various passageways may be had by connection of conduits or other channel-defining members to peripheral boundaries of the base member 50. A schematic representation of the analog-type fluid amplifier shown in FIGURE 5 is illustrated in FIGURE 1.

The dynamic performance of the spring mass device must be considered, as opposed to the steady-state characteristics thereof in considering the performance of my error sensing circuit. Thus, the dynamic response of the circuit depends on the modulation frequency in the fluid output differential pressure signal $\Delta P_0$ rather than on the carrier frequency (frequency of fluid signal generated by the sinusoidal chopper). As an example, a tuned resonant reed having a steady-state resonance of 200 cycles per second may be a component of the error sensing circuit having a circuit resonance of approximately 16 cycles per second. A typical damping ratio for this circuit resonance is in the order of 0.5.

The error sensing circuit hereinabove described comprises an analog-type circuit wherein the magnitude of the fluid output differential pressure signal $\Delta P_0$ is proportional to the magnitude of the error in the control system variable. A digital-type error sensing circuit may also be developed in light of the above teachings. In such digital circuit, a fluid-mechanical sensor such as the sinusoidal chopper heretofore described, may be employed to generate a pressurized fluid signal. The generated signal, as in the case for the analog-type circuit, may have any wave shape including the sinusoidal form, the criterion being that the fluid signal have a frequency equal to, or proportional to, the monitored value of the control system variable. The fluid amplifier device employed in the digital-type error sensing circuit is a digital-type fluid amplifier (not shown). The digital-type fluid amplifier is a fluid control device adapted for generating pressurized output fluid signals having a square wave form. Thus, the output of the digital-type fluid amplifier would merely be an "ON-OFF" type error indication and further elements would be necessary in the control system to convert such fluid signal to a signal indicating the magnitude of error of a control system variable.

From the foregoing description, it can be appreciated that my invention makes available a new fluid-operated error sensing circuit which employs a fluid amplifier as a fluid control device providing a pressurized fluid output signal indicative of the deviation of a control system variable from a desired value thereof. The error sensing circuit is a relatively simple one comprising a sensor for generating a pair of 180° phase displaced fluid signals representing the monitored value of the control system variable, a pair of tuned resonant devices for generating a pair of fluid signals which represent the monitored value of the control system variable as a function of the resonant frequencies of the tuned devices, and a fluid amplifier device wherein the control fluid inlets thereof are supplied with the fluid signals generated by the tuned resonant devices. The fluid output signal developed at the power fluid outlets of the fluid amplifier is indicative of the deviation of the control system variable from the desired value thereof. The desired value of the control system variable is defined by a frequency intermediate the two resonant frequencies of the tuned resonant devices and the fluid output signal further indicates that the control system variable is within a predetermined operating range substantially defined by the two resonant frequencies. The use of fluid amplifiers in place of fluid control devices having mechanical moving parts permits improved sensitivity of the error sensing circuit since the avoidance of frictional wear permits detection of smaller error signals.

Having described a particular embodiment of my fluid-operated error sensing circuit and two additional embodiments of an amplitude of vibration sensing circuit employed with the tuned resonant devices, it is believed obvious that modifications and variations of my invention are possible in the light of the above teachings. Thus, various configurations of members may be employed for intercepting fluid flow between the sensing nozzle and sensing receiver associated with the tuned resonant devices. Further, the sensor means for generating fluid signals of frequency representing the monitored value of a control system variable may take any of the number of structural forms, being determined primarily by the condition or control system variable to be monitored thereby. My error sensing circuit in its broadest sense is adapted to indicate the error of any condition or control system variable which can be monitored as a frequency-responsive fluid signal. Frequency, rotational velocity, pressure and temperature are a few examples of conditions that may be sensed and controlled with my invention. It is, therefore, to be understood that changes may be made in the particular embodiment of my invention as described which are within the full intended scope of the invention as defined by the following claims.

What I claim as new and desire to secure by Letters Patent of the United States is:

1. A fluid-operated error sensing circuit comprising
   sensor means for generating first fluid signals having a frequency representing the monitored value of a control system variable,
   resonant means in communication with said sensor means for generating second fluid signals representing the monitored value of the control system variable as a function of two resonant frequencies of said resonant means wherein the two resonant frequencies define a predetermined range of values of the control system variable, and
   a fluid amplifier device having a power fluid inlet, two control fluid inlets and two power fluid outlets, a first and second of said control fluid inlets in communication with said resonant means, said fluid amplifier device providing fluid output signals at said power fluid outlets indicative of the deviation of the control system variable from a desired value thereof wherein the desired value is represented by a frequency intermediate the two resonant frequencies, said fluid amplifier device having no mechanical moving parts thereby avoiding frictional wear and providing highly reliable circuit operation.

2. A fluid-operated error sensing circuit comprising
   sensor means for generating first fluid signals having a frequency representing the monitored value of a control system variable,
   a pair of tuned resonant devices in communication with said sensor means for generating a pair of second fluid signals representing the monitored value of the control system variable as a function of two resonant frequencies of said resonant devices wherein the two resonant frequencies define a predetermined range of values of the control system variable, and
   a fluid amplifier device having a power fluid inlet, two control fluid inlets and two power fluid outlets, a first and second of said control fluid inlets in communication respectively with a first and second of said pair of resonant devices, said fluid amplifier device providing fluid output signals at said power fluid outlets indicative of the deviation of the control system variable from a desired value thereof wherein the desired value is defined by a frequency intermediate the two resonant frequencies, said fluid amplifier device having no mechanical moving parts thereby avoiding frictional wear and providing highly reliable circuit operation.

3. A fluid-operated error sensing circuit comprising
   sensor means provided with two fluid outlets for generating a pair of first fluid signals having a frequency representing the monitored value of a control system variable,
   a pair of tuned resonant devices, each said resonant device provided with two vibration inducing fluid inlets and a vibration responsive fluid outlet, a first and second of said two fluid inlets of each said resonant device in communication respectively with a first and second of the two fluid outlets of said sensor means, a first and second of said resonant devices tuned respectively to a first and second resonant frequency wherein the resonant frequencies define a predetermined range of values of the control system variable, and
   a fluid amplifier device having a power fluid inlet, two control fluid inlets and two power fluid outlets, a first and second of said control fluid inlets in communication respectively with the fluid outlets associated with said first and second resonant devices, said fluid amplifier device providing fluid output signals at said power fluid outlets indicative of the deviation of the control system variable from a desired value thereof wherein the desired value is defined by a frequency intermediate the two resonant frequencies.

4. A fluid-operated error sensing circuit comprising
sensor means provided with a pair of fluid outlets for generating a pair of 180° phase displaced pressurized fluid signals having a frequency representing the monitored value of a control system variable,
a pair of tuned resonant vibrating members, each said resonant member provided with a pair of oppositely disposed fluid inlets and a vibration responsive fluid outlet, a first and second of said pair of resonant members tuned respectively to a first and second resonant frequency wherein the two resonant frequencies define a predetermined range of values of the control system variable, a first and second fluid inlet of each said pair of oppositely disposed fluid inlets in communication respectively with a first and second of the fluid outlets of said sensor means whereby fluid signals provided within the vibration responsive fluid outlets represent the monitored value of the control system variable as a function of the two resonant frequencies, and
a fluid amplifier device having a power fluid inlet, two control fluid inlets and two power fluid outlets, a first and second of the control fluid inlets in communication respectively with the vibration responsive fluid outlets of said first and second resonant members whereby said fluid amplifier device provides pressurized fluid output signals at said power fluid outlets indicative of the deviation of the control system variable from a desired value thereof wherein the desired value is defined by a frequency intermediate the two resonant frequencies.

5. A fluid-operated error sensing circuit comprising
a fluid-mechanical chopper device provided with a first pair of fluid outlets displaced 180° apart and a second pair of fluid outlets for generating a pair of 180° phase displaced pressurized fluid signals having a frequency representing the monitored value of a control system variable,
a pair of tuned resonant vibrating members, each said resonant member provided with a pair of oppositely disposed vibration inducing fluid inlets in communication with a first and second of said second pair of fluid outlets, said resonant members each having a fixed first end and a free second end adapted to be vibrated in response to pressurized fluid signals supplied by said fluid inlets of frequency within the frequency response of the corresponding resonant member, the second end of each said resonant member positioned between a nozzle supplied with a relatively constant pressure fluid and a fluid receiver whereby the magnitude of vibration of each said resonant member determines the fluid signal supplied to the receiver associated with each resonant member, said first and second resonant members tuned respectively to a first and second resonant frequency wherein the two resonant frequencies define a predetermined range of values of the control system variable and fluid signals obtained within said receivers represent the monitored value of the control system variable as a function of the two resonant frequencies, and
a fluid amplifier device having a power fluid inlet, two control fluid inlets and two power fluid outlets, a first and second of said control fluid inlets in communication respectively with the fluid receivers of said first and second resonant members whereby said fluid amplifier device provides pressurized fluid output signals at said power fluid outlets indicative of the deviation of the control system variable from a desired value thereof wherein the desired value is defined by a frequency intermediate the two resonant frequencies.

6. The fluid-operated error sensing circuit described in claim 5 wherein said fluid-mechanical chopper comprises a disc shaped member adapted to be mounted in angularly displaced orientation on a rotatable shaft, and a stationarily positioned member having a fluid inlet, said first pair of fluid outlets in communication with the latter said fluid inlet and said second pair of fluid outlets whereby said first pair of fluid outlets are adapted to be alternately closed off by the rotating disc member thereby causing fluid to flow from the said latter fluid inlet to alternate of said second pair of fluid outlets for generating the pair of 180° phase displaced pressurized fluid signals having a frequency representing the monitored value of the control system variable.

7. A frequency control apparatus comprising
two spring mass devices having natural vibration frequencies respectively above and below a desired value of frequency to be maintained, each said device provided with a vibration responsive fluid outlet,
fluid-mechanical means for monitoring a frequency and for vibrating said spring mass devices at the monitored frequency, said fluid-mechanical means provided with two fluid outlets for generating a pair of fluid signals having a frequency representing the monitored value, and
an analog-type fluid amplified device having a power fluid inlet, two control fluid inlets and two power fluid outlets, a first and second of said control fluid inlets in communication respectively with the fluid outlets associated with said spring mass devices whereby said fluid amplifier device provides a fluid output differential pressure signal at said power fluid outlets indicative of the deviation of the frequency from the desired value thereof, said fluid amplifier device having no mechanical moving parts thereby avoiding frictional wear and providing highly reliable apparatus operation.

8. A fluid-operated error sensing circuit comprising
sensor means provided with a pair of fluid outlets for generating a pair of 180° phase displaced pressurized fluid signals having a frequency representing the monitored value of a control system variable,
two spring mass devices having natural vibration frequencies respectively above and below a desired value of frequency representing a desired value of the control system variable to be maintained, each said device having a fixed end and a free end,
first and second pairs of oppositely disposed fluid inlets positioned respectively intermediate the fixed and free ends of the first and second of said devices and in impinging relationship thereto, each said pair of oppositely disposed fluid inlets in communication with said pair of fluid outlets to thereby vibrate said devices at the monitored frequency whereby the amplitude of vibration thereof is determined by the proximity of the monitored frequency to the respective natural vibration frequency,
a fifth and sixth fluid inlet supplied with a relatively constant pressure fluid for generating respectively a first and second constant pressurized fluid jet,
a first and second fluid receiver aligned respectively with said fifth and sixth fluid inlets for receiving fluid from the jets generated thereby, the free ends of the first and second said devices positioned respectively between said fifth inlet and said first receiver and between said sixth inlet and said second receiver whereby the vibration of the free ends of said spring mass devices determine the amount of the fluid jet received in each respective receiver wherein such received fluid represents the monitored value of the control system variable as a function of the respective natural vibration frequency, and
a fluid control device having a power fluid inlet, two control fluid inlets, and two power fluid outlets, a first and second of the two control fluid inlets in communication respectively with said first and second fluid receivers whereby a fluid output differential pressure signal is developed at said power fluid outlets indicative of the deviation of the control system variable from the desired value thereof.

9. The fluid-operated error sensing circuit described in claim 8 wherein the free ends of said spring mass devices each comprise totally intercepting surfaces for the fluid issuing from said fifth and sixth fluid inlets in the nonvibratory mode of operation of said devices.

10. The fluid-operated error sensing circuit described in claim 8 wherein the free ends of said spring mass devices each include an opening for passage of the fluid issuing respectively from said fifth and sixth fluid inlets to said first and second receivers in the nonvibratory mode of operation of said devices.

References Cited by the Examiner
UNITED STATES PATENTS
2,729,751    1/1956    Westman _____ 322—32
2,879,467    3/1959    Stern _____ 322—32

OTHER REFERENCES

Iseman: "Angular Velocity Regulation," Harry Diamond Laboratories, Fluid Amplification Symposium, May 1964; pages 90–94 and 111–114.

Christianson: "Dynamic Response Study of a Mechanical-Hydraulic Frequency Governor," ASME Paper 57 IRD–14, April 8, 1957.

Veller et al.: "A Water Control System for Steam Turbines," Automation and Remote Control, vol. 23, No. 12, page 1617, December 1962.

Katz et al.: "Angular Speed Control," Control Engineering, July 1963; pages 133–135.

LOUIS J. CAPOZI, *Primary Examiner.*

LEO SMILOW, *Examiner.*

W. F. BAUER, *Assistant Examiner.*